3,193,029
WEIGHING APPARATUS
Ronald Eric Harvison, Wirral, and Kenneth Mainey, Maghull, England, assignors to J. Bibby & Sons Limited, Lancashire, England, a British company
Filed Aug. 12, 1963, Ser. No. 301,573
Claims priority, application Great Britain, Aug. 21, 1962, 31,974/62
3 Claims. (Cl. 177—120)

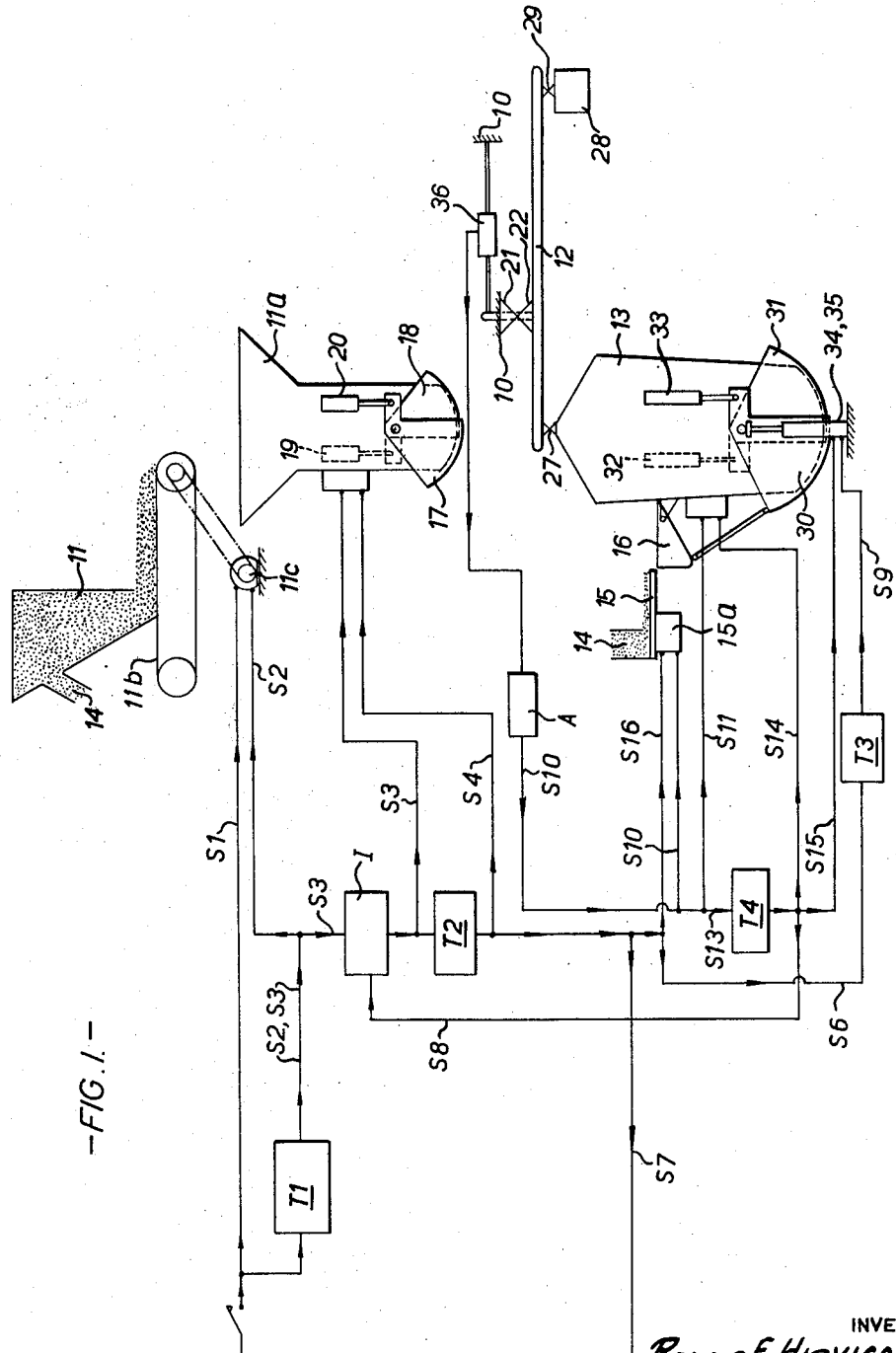

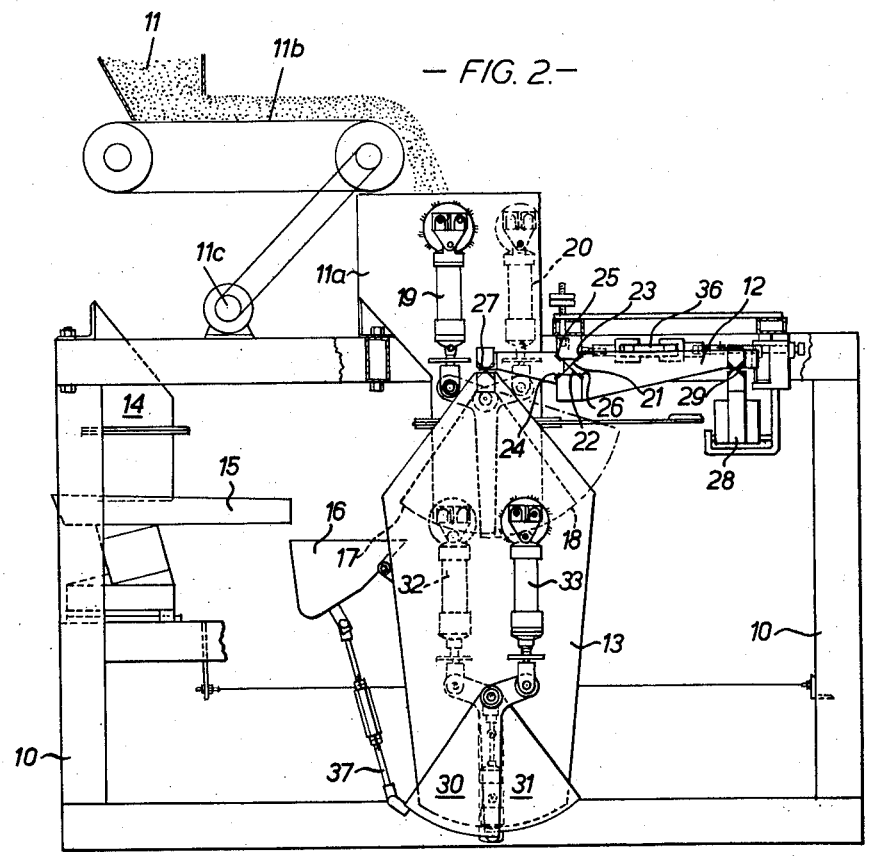

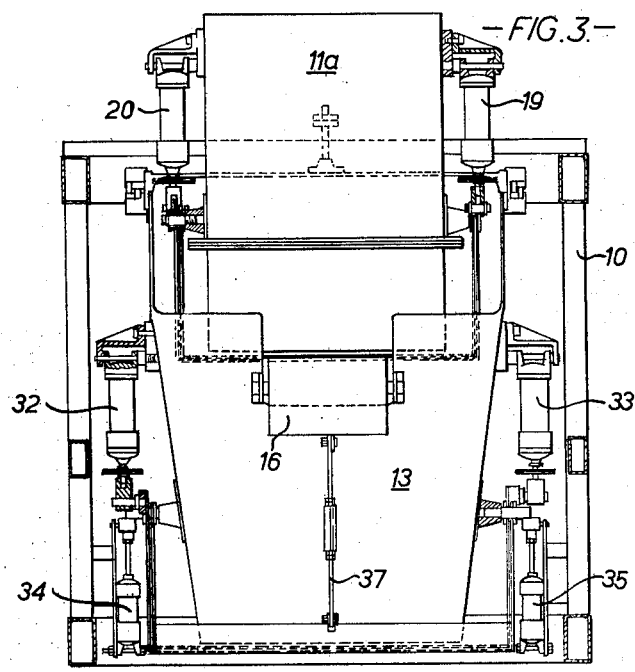

This invention is for improvements in or relating to weighing apparatus.

The invention is particularly, although not exclusively concerned with apparatus for automatically delivering weighed quantities of material into bags or other containers.

An object of the present invention is to provide an apparatus which will automatically deliver a correct or substantially correct weight of material into a bag or other container and thereby eliminate or substantially reduce the amount of overweight which has at present to be given so as to avoid the possibility of a customer receiving short weight.

According to the present invention there is provided a weighing apparatus operatively associated with a load-sensitive device adapted, when subjected by the load to a predetermined stress, to provide an electric signal for terminating loading of the apparatus.

More particularly the present invention provides a weighing apparatus comprising a weigh-beam or the like, a load pan or hopper on or suspended from said weigh-beam, a load-sensitive device operatively associated with the weigh-beam and adapted, when subjected by the load to a predetermined stress, to produce an electric signal in accordance with the load on the weigh-beam, means for feeding material in bulk into said load pan or hopper and means for feeding or dribbling load make-up material into said pan or hopper, or into an auxiliary hopper or pan associated therewith, said load make-up means being controlled by said electric signal so that the feed of load make-up material is terminated when the correct or substantially correct weight of material is available for delivery.

In preferred embodiments of the invention the load-sensitive device is what is known as a load cell. A load cell is a device comprising a member which, when subjected to a stress (e.g. tension) has its electrical resistance altered. This characteristic is utilised to produce in an electric circuit, in which said member is included, an electric signal which, appropriately amplified if necessary, can be used to terminate the feeding of load make-up material. In other words, the load cell acts as a vernier and operates only during the final weighing stage.

Preferably the weigh-beam, instead of being mounted on a knife edge or knife edges in the usual way, is supported by a crossed leaf-spring arrangement. Such an arrangement provides considerable accuracy, because it is frictionless and is subject to little, if any, wear in use. Similarly, it is preferable to suspend the load pan or hopper from one arm of the weigh-beam by a crossed leaf-spring arrangement and a counterbalance weight from the other arm of the weigh-beam also by a crossed leaf-spring arrangement.

To avoid any shock on the weighing system, when the initial bulk or main weight of material is fed into the weigh pan or hopper, it is convenient to support the pan on a dashpot or pneumatic or hydraulic leg device during the period when this bulk weight of material is being fed into it, the arrangement being such that only after the pan or weigh hopper has been filled with the initial bulk weight is the weight thereof applied to the weigh-beam.

It will be appreciated that the smaller the weight of make-up material which has to be fed into the weigh pan or hopper, or the auxiliary pan associated therewith, so as to achieve the correct or substantially correct weight, the quicker bags or other containers can be filled one after the other.

One particular embodiment of the invention, as applied to an apparatus for filling bags (e.g. 56 lb. bags) with weighed amounts of material, will now be described, by way of example. In the following description reference is made to the accompanying drawings wherein:

FIGURE 1 is a diagrammatic representation of the apparatus,

FIGURE 2 is a side elevation, and

FIGURE 3 is a front elevation.

The apparatus shown on the drawing comprises a frame 10 which supports, at its upper part, a hopper 11 for the material to be weighed and delivered into the bags.

The machine also comprises a weigh-beam 12 from one arm of which there is suspended a weighing hopper or pan 13.

The hopper 11 is provided with a chute 14 (see FIGURE 1) by which weight make-up material is fed, to a jogging frame or dribble feeder 15 and thereby into a weight make-up pan 16 which delivers it, as hereinafter described, into the weighing hopper or pan 13.

The delivery of the main bulk of material to be weighed from the hopper 11 into a storage chamber 11a is time controlled by the starting and stopping of a belt conveyor 11b. The weight of material fed into the storage chamber 11a depends on the time said belt conveyor 11b is running and is under, but as near as possible to the exact weight required.

The delivery of the main bulk of material to be weighed from the storage chamber 11a into the weigh pan or hopper 13 is controlled by the opening and closing of a pair of shutters 17 and 18 operated by pneumatic piston and cylinder devices 19 and 20. The said doors are opened for a time sufficient to allow all the material stored in the storage chamber 11a to fall into the weigh pan or hopper 13.

The weigh-beam 12 is supported from the frame of the machine by crossed flexible springs 21 and 22 located one behind the other (as viewed in FIGURE 2), the spring 21 being attached to the machine frame at 23 and to the weigh-beam at 24 whilst the spring 22 is attached to the machine frame at 25 and to the weigh-beam at 26.

A similar crossed flexible spring arrangement 27 is provided for suspending the weigh pan 13 from the weigh-beam.

The weigh-beam counterbalance weight 28 is also suspended from the weigh-beam by a crossed flexible leaf-spring arrangement 29.

The lower open end of the weighing pan or hopper 13 is provided with a pair of arcuate doors 30 and 31 which are operated by pneumatic piston and cylinder devices 32 and 33, the doors being opened when a weighing operation has been completed so as to discharge the contents of the pan 13, via a chute located below it, into the bag to be filled.

The weight of the pan 13 and its contents, except during the final stage in the weighing operation, is supported by pneumatic piston and cylinder or dashpot devices 34 and 35. This avoids shock and unnecessary strain on the actual weighing mechanism.

The weighing mechanism includes, in addition to the weigh-beam 12 and its associated parts, a load cell 36. The member of this load-cell, the electrical resistance of which changes when the member is subjected to a stress, is connected between the stationary frame of the apparatus and the weigh-beam 12 so that it will be subjected to tension when the weigh-beam moves during the final stage of a weighing operation.

The jogging frame or dribble feeder 15 is actuated by an electric motor the stopping of which is effected, through appropriate contactor gear, under the control of the load cell 36. It will be noted that the pan 16 is, to all intents and purposes, part of the weighing pan or hopper 13 so that the material in the pan 16 adds its weight to the material in the pan 13. When the correct weight has been achieved the doors 30 and 31 are opened, as previously described, and the movement of the door 30 through a connecting rod 37 tilts the pan 16 so that the weight make-up material therein is tipped into the hopper 13.

Appropriate interconnected timing devices are provided for ensuring that the various mechanism (i.e. the doors 17 and 18, the starting and stopping of belt conveyor 11b, pneumatic cylinders 34 and 35, starting of the motor driving the dribble feeder 15, and doors 30 and 31) operate in sequence and automatically at the appropriate times.

These timing devices and the mode of operation of the apparatus above is described as follows:

At the commencement of the first weighing operation a signal is sent, via $S_1$, to start the belt conveyor 11b and at the same time an electronic delay timer $T_1$ is triggered. At the termination of this delay a signal is sent, via $S_2$, to stop the belt conveyor. Thus, near the required correct weight of material is delivered into the storage chamber. A signal also passes, via $S_3$, through closed contacts in an electronic store interlock I, opens the storage chamber shutters 17 and 18, so that the near correct weight of material is delivered into the weighing hopper 13, and triggers another delay timer $T_2$. At the termination of this delay a signal is sent, via $S_4$, to close this storage chamber shutters 17 and 18, the delay timer $T_3$ is triggered, via $S_6$, and the dribble feed supply is started by a signal via $S_{16}$. A further signal from the delay timer $T_2$ is sent back, via $S_7$, through the starting switch to re-start the belt conveyor and trigger the electronic delay timer $T_1$. Also at the termination of delay time $T_2$ the above mentioned contacts in the interlock I open so as to open the circuit $S_3$ through said interlock.

As before, at the end of this delay period $T_1$ the belt conveyor is stopped, but the signal to open the storage chamber shutters 17 and 18 is locked in the interlock I until it is freed by an incoming signal, via $S_8$, to the interlock, which closes its above-mentioned contacts, from another part of the circuit as is explained later.

At the termination of the delay period $T_3$, the pneumatic devices 34 and 35 are operated by a signal via $S_9$, to allow the weigh-beam 12 to take the weight of the hopper 13 and its contents, the weigh-beam slowly moving up to its horizontal position under control of its counter-weight 28, the load cell 36 during this time being inoperative. For example, if the desired weight is 56 lbs., the beam is arranged to be horizontal at 50 lbs. and the load cell then comes into operation and measures the final 6 lbs. through a 5 to 1 beam ratio applying 30 lbs. to the load cell. This provides better sensitivity. As material is fed into the weight make-up pan 16, by the dribble feeder 15, the total weight of material suspended from the weigh scale increases and through the weigh-beam acts on the load cell 36 until, at the correct or substantially correct weight (i.e. the weight of material in the pan 13 plus the weight of material in the pan 16) dribbling or jogging of material into the pan 16 ceases due to the load cell sending a signal, via amplifier A, and $S_{10}$ to stop the dribble feed 15. This same signal, via $S_{11}$, opens the weigh-pan doors 30 and 31, to deliver the substantially correct weighed quantity of material into a bag waiting below, and via $S_{13}$ triggers delay timer $T_4$. At the termination of this delay period $T_4$ a signal is sent, via $S_{14}$, to close the weigh pan doors 30 and 31 and a signal is sent, via $S_{15}$, to make the cylinders 34 and 35 operative again to take the weight of the pan and its load. A further signal from the delay timer $T_4$ is sent to the interlock I via $S_8$. Providing the belt conveyor 11b has finished delivering the main bulk of material into the storage chamber then the signal from the electronic timer $T_1$ is released and the cycle of operation is repeated. If the signal from the electronic delay timer $T_1$ reaches the interlock after the signal from the delay timer $T_4$ it passes through the interlock without any delay and the cycle of operation is repeated.

In other words, providing the belt conveyor 11b has finished delivering the main bulk of material into the storage chamber 11a, as soon as the doors 30 and 31 close, the doors 17 and 18 open and the cycle of operations is then repeated for the next bag to be filled. If the belt conveyor 11b has not finished delivering the main bulk of material into the storage chamber 11a, when the doors 30 and 31 close, then the opening of doors 17 and 18 is delayed until the belt conveyor 11a stops.

It will be appreciated that the belt conveyor should run for such a period that as nearly as possible the correct weight is delivered into the storage chamber so as to reduce the time occupied in feeding weight make-up material into the pan 16.

We claim:

1. An apparatus for delivering measured quantities of material by weight comprising a frame, a hopper for material to be weighed supported on said frame, a weigh beam, means pivotally supporting the weigh beam on the frame, a weigh pan on said weigh beam, means for feeding material in bulk at a predetermined rate from said hopper to said weigh pan, control means including timing devices operative at predetermined times to start and stop said feeding of material in bulk from the hopper to the weigh pan so that an approximately predetermined bulk weight of material less than the correct weight is delivered periodically into the weigh pan, pressure fluid leg means, for said weigh pan, operative during feeding of material in bulk into the pan, to take the weight thereof of the weight beam, means operative when said bulk weight of material has been delivered into the pan to render said legs inoperative so that the bulk weight is applied to the weigh beam, means including a driving mechanism for dribbling weight make-up material into the weigh pan and control means for said driving mechanism, which control means includes a timing device for starting said driving mechanism at a predetermined time and a load-cell operatively connected to the weigh beam so that it is subjected to the load on the weigh beam whereby, when the correct weight of material has been delivered to the pan, the load-cell terminates operation of said driving mechanism for the dribble feed means.

2. An apparatus for delivering measured quantities of material by weight comprising a frame, a hopper for material to be weighed supported on said frame, a weigh beam, means pivotally supporting the weigh beam on the frame, a weigh pan on said weigh beam, means for feeding material in bulk at a predetermined rate from said hopper to said weigh pan, control means including timing devices operative at predetermined times to start and stop said feeding of material in bulk from the hopper to the weigh pan so that an approximately predetermined weight of material less than the correct weight is delivered periodically into the weigh pan in a predetermined time, a weight make-up pan, means including a driving mechanism for dribbling weight make-up material into said weight make-up pan, control means for said driving mechanism, which control means includes a timing device for starting said driving mechanism at a predetermined time and a load-cell operatively connected to the weigh beam so that it is subjected to the load on the weigh beam whereby, when the correct weight of weight make-up material has been delivered to the weight make-up pan, the load-cell terminates operation of said driving mechanism for the dribble feed means, and means for thereupon discharging the contents of the weight make-up pan into the weigh pan.

3. An apparatus as claimed in claim 2 wherein the weight make-up pan is pivotally supported on the weigh pan and the weigh pan has door means openable for the discharge of material from it and wherein said door means is operatively connected to the weight make-up pan so that opening of said door means tilts said weight make-up pan to discharge its contents into the weigh pan.

References Cited by the Examiner

UNITED STATES PATENTS

| | | | |
|---|---|---|---|
| 849,418 | 4/07 | Nickerson | 177 |
| 948,289 | 2/10 | Cromley | 177—81 |
| 1,598,128 | 8/26 | Gase | 177—122 |
| 1,981,697 | 11/34 | Hartmann | 177—81 |
| 2,191,711 | 2/40 | Godat | 177—122 |
| 2,766,981 | 10/56 | Lauler et al. | 177—211 |
| 2,781,994 | 2/57 | Lindstaedt et al. | 177—120 |
| 2,902,272 | 9/59 | Meier | 177—189 |
| 2,919,909 | 12/59 | Pelz | 177—71 |
| 2,983,325 | 5/61 | Moody | 177—71 |
| 3,000,454 | 9/61 | Hopkins et al. | 177—81 |
| 3,091,301 | 5/63 | Stone | 177—1 |
| 3,108,647 | 10/63 | Harmon et al. | 177—1 |

FOREIGN PATENTS 507,607 6/39 Great Britain.

LEO SMILOW, *Primary Examiner.*